Nov. 12, 1940.   H. J. MANKOFF   2,221,002

HAMMER FOR FEED GRINDING MACHINES

Filed Sept. 14, 1939

INVENTOR.
HENRY J. MANKOFF
BY U. Y. Charles
ATTORNEY.

Patented Nov. 12, 1940

2,221,002

UNITED STATES PATENT OFFICE 2,221,002

HAMMER FOR FEED GRINDING MACHINES

Henry J. Mankoff, Wichita, Kans.

Application September 14, 1939, Serial No. 294,876

1 Claim. (Cl. 83—11)

My invention relates to new and useful improvements in hammers for feed grinding machines, and has for its principal object a cutting disc, reversible and rigidly carried by a shank to avoid rotation of the disc, whereby the worn or dull portion of the disc as a result of prolonged usage may be substituted by turning the disc so that its undisturbed or sharp portion thereof will confront its line of travel.

A further object of my invention is to provide a circular cutting element whereby its first instant of contact with substance severed thereby will engage a minor portion of the cutting edge and from thence gradually to its major cutting width, whereby the cutting element will consume a minimum of power.

A still further object of my invention is to provide a disc axially secured to the end of a shank and means to attach the shank against rotation but adapted to be turned through an arc of 180 degrees or at intervals therebetween, and means to secure the disc against further rotation when engaged as a hammer cutting and grinding element.

A still further object of my invention is to provide a disc-like element having one end of a shank axially secured to the disc, the periphery of the disc being sharpened as a cutting element and subject to being turned and secured selectively at intervals until the edge of said disc for its entire periphery is reduced beyond cutting ability and whereby prolonged cutting capacity is had, the disc-movement at all times being in the direction of a diametrical axis; in other words, the sides being tangent with the arc of the cylinder.

A still further object of my invention is to provide a cutting element comprised of a shank and peripherally cutting disc integrally connected in such a way that the shank extends axially from the center of the disc, the element as a whole to function as a hammer and being an article of manufacture for the purposes herein set forth; furthermore the said hammer as arranged and applied to mills is a means to minimize the power required to operate them, conjestion and the usual drag of substance being ground.

These and other objects will hereinafter be more fully explained, reference being had to the accompanying drawing forming a part of this specification, in which like characters will apply to like parts in the different views.

Referring to the drawing.

Figure 1:
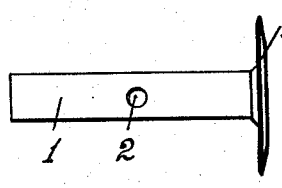
Fig. 1 is a side view of the hammer.
Figure 2:
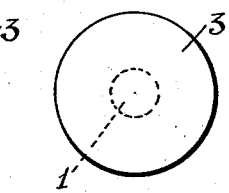
Fig. 2 is a view from the disc end of the hammer.
Figure 3:
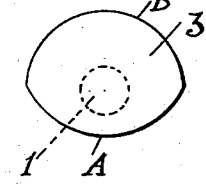
Fig. 3 represents a worn condition of the disc.
Figure 4:
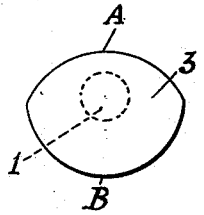
Fig. 4 represents the disc turned with its worn portion rearward with respect to a forward movement of operation.

The invention herein disclosed consists of a shank 1 apertured transversely, intermediate of its ends as at 2, the shank having a disc 3 axially secured to one end thereof by welding or otherwise, the disc having a sharp peripheral edge to function as a cutter when employed as a hammer for grinding machines, the cylinder of the grinding machine to be equipped with a sleeve 4 by welding one end thereof to an appropriate bearing, or otherwise securing the same, the other end of the sleeve being open to receive the shank insertible therein, fitting closely so that said shank may be removed from, or turned in the sleeve, and the shank being secured by a bolt 5 passing through an appropriate aperture through the sleeve and through said aperture of the shank. Being so secured, the disc can be turned through an arc of 180 degrees whereby the cutting edge may be reversed when one portion thereof has become worn as at A shown in Fig. 3, the worn portion being substituted for by the remaining sharp portion B of the disc as shown in Fig. 4.

Figure 6:
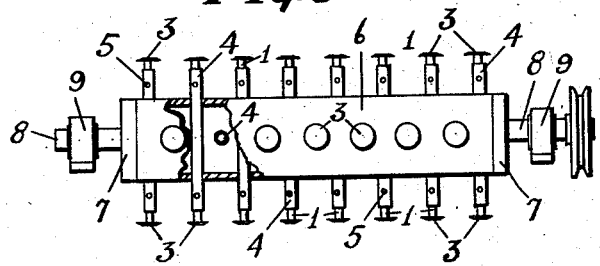
Fig. 6 is a side view of a grinding cylinder to illustrate the adaptation of the device as a hammer.

In Fig. 6 is shown a grinding cylinder having a body portion 6, cylindrical in form, the ends of which are closed by heads 7 by welding, or otherwise secured, each of said heads having their respective spindles 8 to engage in suitable bearings 9 whereby the cylinder is trunnioned and the said bearings may be secured to the body of a grinding machine, the latter not being shown in the drawing.

Figure 5:
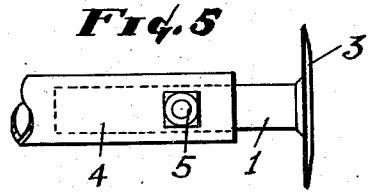
Fig. 5 is a similar view to that of Fig. 1 to illustrate the shank positioned in a sleeve, the latter shown partially broken away, and means to secure the shank in the sleeve.

As a convenient means in this type of cylinder, the cylindrical portion thereof may be bored transversely in rows spaced therearound in staggered relation to avoid contact of said sleeves 4 that outwardly extend equally from each side of the cylindrical body and are rigidly secured, the outer ends of the sleeves being open as heretofore described to receive said shanks secured therein as shown in Fig. 5.

It will now be seen that the provision of discs with the sides thereof transversely crossing radial planes of the grinding cylinder is the principle of my invention, regardless of the supporting means for such disc positioning. A preferred supporting construction is to connect the discs to the grinding cylinder rigidly and against rotation on their own axes while grinding, but rotatable when it is desired to present a new cutting edge; and therefore means for doing this is a feature of my invention. My invention may be modified in any manner lying within the scope of the appended claim.

Having fully described my invention what I claim as new and desire to secure by Letters Patent is:

A feed grinding device comprising a cylinder in the form of a tubular body, a spindle secured to each end of said cylinder, means secured to one of said spindles for rotating said cylinder, a first series of sleeves spaced along said cylinder, said sleeves being in alignment and each sleeve passing diametrically through said cylinder so that a portion of each end of each sleeve extends outwardly from said cylinder, a like series of sleeves, each sleeve of said second series also passing diametrically through said cylinder, the axes of each series of sleeves lying in a plane, the two planes of such axes of said two series being at right angles to each other, a shank telescopically mounted in each end of each of said sleeves, a disc coaxial with each shank and secured to the outer end thereof, each of said discs being beveled on its outer face, the slant of the bevel coinciding substantially with the arc circumscribed by the outer extremity of said disc as said cylinder rotates.

HENRY J. MANKOFF.